US012643434B2

(12) United States Patent (10) Patent No.: US 12,643,434 B2
Suzuki et al. (45) Date of Patent: Jun. 2, 2026

(54) CHARGE AND DISCHARGE CONTROL SYSTEM FOR FUEL CELL VEHICLE

(71) Applicant: Honda Motor Co., Ltd., Tokyo (JP)

(72) Inventors: Kenta Suzuki, Tokyo (JP); Satoshi Oshima, Tokyo (JP); Kenichi Shimizu, Tokyo (JP); Hajime Abe, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 18/444,968

(22) Filed: Feb. 19, 2024

(65) Prior Publication Data

US 2024/0286526 A1 Aug. 29, 2024

(30) Foreign Application Priority Data

Feb. 28, 2023 (JP) ................................. 2023-029115

(51) Int. Cl.
*B60L 58/30* (2019.01)
(52) U.S. Cl.
CPC ........... *B60L 58/30* (2019.02); *B60L 2210/10* (2013.01)
(58) Field of Classification Search
CPC .............................. B60L 58/30; B60L 2210/10
See application file for complete search history.

(56) References Cited

U.S. PATENT DOCUMENTS

| | | | | |
|---|---|---|---|---|
| 10,797,360 | B2 * | 10/2020 | Nozaki | ................. H01M 10/44 |
| 2006/0012340 | A1 * | 1/2006 | Saeki | .................. H01M 16/006 |
| | | | | 320/132 |
| 2021/0104758 | A1 | 4/2021 | Tanimoto | |
| 2021/0194025 | A1 * | 6/2021 | Ichikawa | ............ H01M 10/425 |
| 2022/0029571 | A1 * | 1/2022 | Kitamoto | ............. B60K 7/0007 |

FOREIGN PATENT DOCUMENTS

| | | |
|---|---|---|
| JP | 2011036101 A | 2/2011 |
| JP | 2021057315 A | 4/2021 |

OTHER PUBLICATIONS

Japanese office action; Application 2023-029115; Apr. 2, 2024.

* cited by examiner

*Primary Examiner* — Edwin A Young
(74) *Attorney, Agent, or Firm* — Duft & Bornsen, PC

(57) ABSTRACT

A vehicle system including a fuel cell, a power storage device and a microprocessor. The microprocessor is configured to perform controlling a traveling of the vehicle by driving of the electric motor with at least one of a first power generated by the fuel cell and a second power stored in the power storage device, and controlling charge and discharge of the power storage device, and the controlling including switching a control mode of the charge and discharge of the power storage device between a first control mode where a first voltage higher than a maximum value of a generated power generated in the fuel cell is set as a minimum voltage of the power storage device and a second control mode where a second voltage lower than the maximum value is set as the minimum voltage of the power storage device.

7 Claims, 5 Drawing Sheets

CHARGE AND DISCHARGE CONTROL SYSTEM FOR FUEL CELL VEHICLE

CROSS-REFERENCE TO RELATED APPLICATION

This application is based upon and claims the benefit of priority from Japanese Patent Application No. 2023-029115 filed on Feb. 28, 2023, the content of which is incorporated herein by reference.

BACKGROUND OF THE INVENTION

Field of the Invention

This invention relates to a vehicle system mounted on a vehicle driven by a motor.

Description of the Related Art

Conventionally, as this type of system, there has been known a vehicle system mounted on a fuel cell vehicle. Such a system is disclosed, for example, in Japanese Unexamined Patent Publication No. 2011-036101 (JP2011-036101A). In the fuel cell vehicle, a load feeding FC voltage based on an output voltage of the fuel cell is set to be higher than a voltage of a secondary battery during normal traveling, and power by the fuel cell is mainly supplied to a load motor. During maximum output traveling such as acceleration, the load feeding FC voltage is set to be the same as the voltage of the secondary battery, and power from both the fuel cell and the secondary battery is supplied to the load motor.

However, in the fuel cell vehicle, there is a case where it is desired to supply only electric power from the secondary battery to the load motor in addition to a case of supplying power from both the fuel cell and the secondary battery to the load motor. In this regard, in JP2011-036101A, complicated processing is performed using three DC voltage converters.

SUMMARY OF THE INVENTION

An aspect of the present invention is a vehicle system mounted on a vehicle driven by an electric motor, including: a fuel cell; a power storage device configured to be chargeable and dischargeable; and an electronic control unit including a microprocessor and a memory connected to the microprocessor. The microprocessor is configured to perform controlling a traveling of the vehicle by driving of the electric motor with at least one of a first power generated by the fuel cell and a second power stored in the power storage device, and controlling a charge and discharge of the power storage device. The microprocessor is configured to perform the controlling including switching a control mode of the charge and discharge of the power storage device between a first control mode where a first voltage higher than a maximum value of a generated power generated in the fuel cell is set as a minimum voltage of the power storage device and a second control mode where a second voltage lower than the maximum value is set as the minimum voltage of the power storage device.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

In a fuel cell vehicle equipped with a vehicle system according to an embodiment of the present invention, a motor for traveling is driven using at least one of electric power (FC power) generated and output by a fuel cell (hereinafter, sometimes referred to as FC) and electric power (battery power) stored in a secondary battery of the vehicle system. Further, electric power (regenerative power) generated during regeneration from the traveling motor is stored in the secondary battery of the vehicle system.

The vehicle system normally sets a first control mode and performs a charge and discharge control of the secondary battery to drive the motor for traveling using both the FC power and the battery power, thereby reducing consumption of hydrogen as fuel. The vehicle system drives the motor for traveling using only the battery power by setting a second control mode and performing the charge and discharge control of the secondary battery when power generation by the fuel cell is not possible, for example, during start-up of the fuel cell. Details of such a vehicle system will be described below with reference to the drawings.

Figure 1:
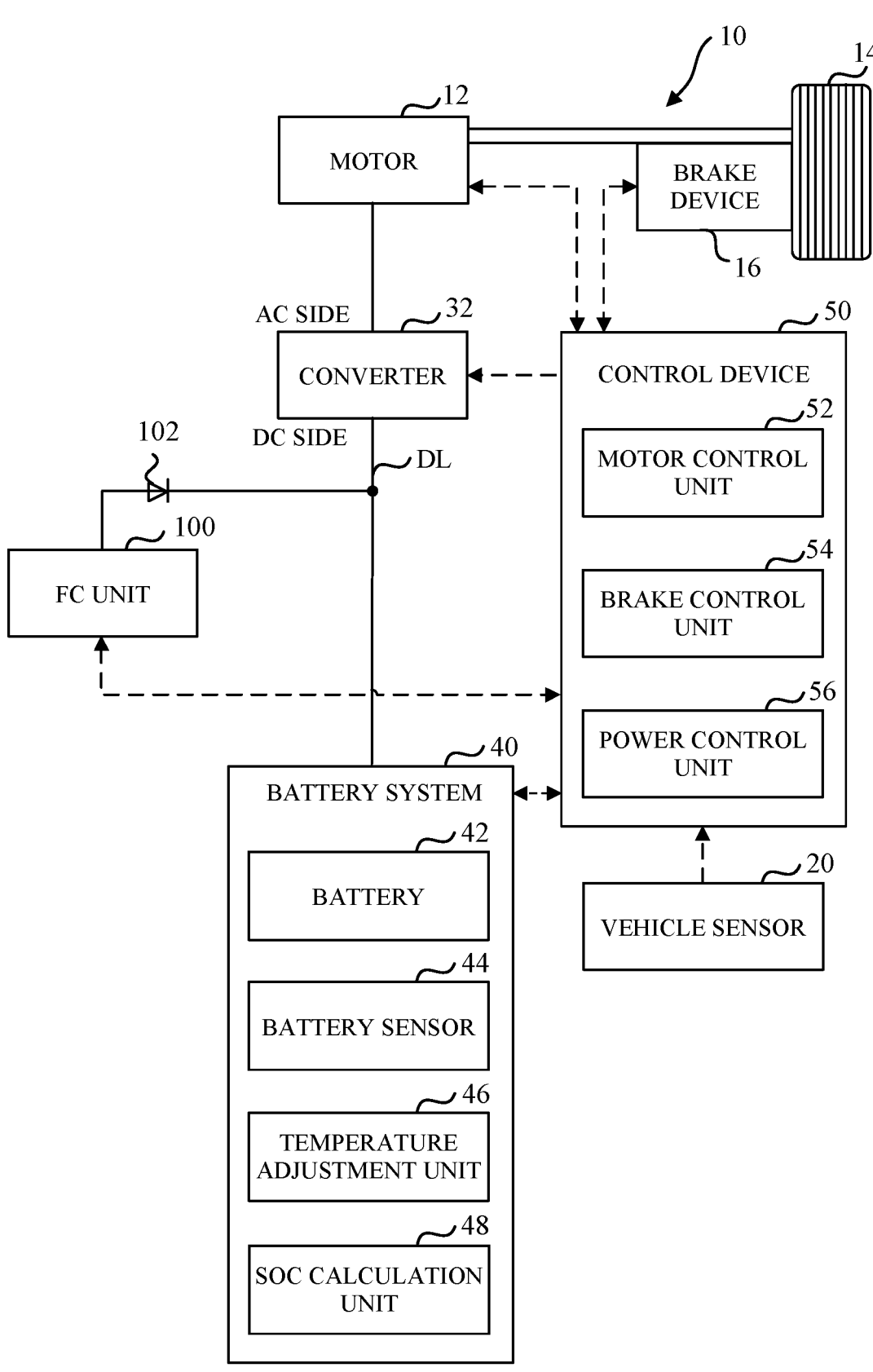
FIG. 1 is a diagram illustrating schematically a configuration of a fuel cell vehicle according to an embodiment of the invention.

FIG. 1 is a schematic configuration diagram illustrating an example of a vehicle system 10 according to an embodiment of the invention. The vehicle system 10 is mounted on a fuel cell vehicle as an example of an electric vehicle driven by a motor 12. The vehicle system 10 includes at least the motor 12 for traveling, a driving wheel 14, a brake device 16, a vehicle sensor 20, a converter 32, a battery system (power storage device) 40, a control device (an electronic control unit) 50, and an FC unit 100. A diode 102 is disposed between the FC unit 100 and the converter 32 to prevent backflow. The diode 102 may be disposed inside the FC unit 100. A solid line connecting the blocks in FIG. 1 indicates an electrical connection, and a broken line connecting the control device 50 and the blocks exemplifies a direction of a signal.

The motor 12 is, for example, a three-phase AC motor. The rotor of the motor 12 is connected to the driving wheel 14. The motor 12 outputs the driving force to the driving wheels 14 using at least one of the FC power output from the FC unit 100 and the battery power stored in the battery system 40 (powering operation). In addition, the motor 12 generates power using kinetic energy of the fuel cell vehicle when the fuel cell vehicle decelerates (regenerative operation).

As an example, the brake device 16 includes a brake caliper, a cylinder that transmits hydraulic pressure to the brake caliper, and an electric motor (all not illustrated) that generates hydraulic pressure in the cylinder. The brake device 16 may include, as a backup, a mechanism that transmits hydraulic pressure generated by the operation of the brake pedal to the cylinder via the master cylinder.

The brake device 16 is not limited to the above-described configuration, and may be an electronically controlled hydraulic brake device that transmits the hydraulic pressure of the master cylinder to the cylinder.

As an example, the vehicle sensor 20 includes an accelerator opening sensor, a vehicle speed sensor, and a brake depression amount sensor (all not illustrated).

The accelerator opening sensor is attached to an accelerator pedal, which is an example of an operation member that receives an acceleration instruction from a driver, detects an operation amount of the accelerator pedal, and outputs the operation amount to the control device 50 as an accelerator opening.

The vehicle speed sensor includes, for example, a speed sensor and a speed calculator (both not illustrated) attached to each vehicle wheel, integrates wheel speeds detected by the wheel speed sensor to derive a speed (vehicle speed) of the fuel cell vehicle, and outputs the speed to the control device 50.

The brake depression amount sensor is attached to the brake pedal, detects an operation amount of the brake pedal, and outputs the operation amount to the control device 50 as a brake depression amount.

The converter 32 is a bidirectional converter that converts a voltage between a DC voltage and an AC voltage. A DC side terminal of the converter 32 is connected to the DC link DL. The battery system 40 is connected to the DC link DL. Further, the FC unit 100 is connected to the DC link DL via the diode 102.

The converter 32 converts the DC voltage into a three-phase AC voltage and supplies the three-phase AC voltage to the motor 12. In addition, the converter 32 converts an AC voltage generated by the regenerative operation of the motor 12 into a DC voltage and outputs the DC voltage to the DC link DL. The voltage obtained by the regenerative operation may be referred to as a regenerative voltage.

The DC voltage supplied from the battery system 40 is output to the DC link DL. The DC voltage output from the FC unit 100 via the diode 102 is output to the DC link DL. The DC voltage supplied from the FC unit 100 may be referred to as an FC voltage.

As an example, the battery system 40 includes a battery 42, a battery sensor 44, a temperature adjustment unit 46, and an SOC calculation unit 48.

The battery 42 is, for example, a secondary battery such as a lithium ion battery. As an example, the battery 42 stores (has charged therein) regenerative power obtained by the regenerative operation of the motor 12 or FC power obtained by the power generating operation of the FC unit 100, and performs discharging to run the fuel cell vehicle and operate an auxiliary machine group to be described later.

As an example, the battery sensor 44 includes a current sensor, a voltage sensor, a temperature sensor, and the like (all not illustrated). The current sensor, the voltage sensor, and the temperature sensor detect a current value, a voltage value, and a temperature of the battery 42, respectively. The battery sensor 44 outputs a signal indicating the detected current value, voltage value, temperature, and the like to the control device 50.

The temperature adjustment unit 46 includes a heating unit 462 and a cooling unit 464 described later with reference to FIG. 3. The temperature adjustment unit 46 heats or cools the battery 42 using, for example, power supplied from the battery 42. As an example, the temperature adjustment unit 46 is controlled by a battery electronic control unit (a battery ECU) (not illustrated) so that the temperature of the battery 42 detected by the battery sensor 44 falls within a predetermined temperature range.

The SOC calculation unit 48 calculates the state of charge (SOC) of the battery 42 based on the output of the battery sensor 44. The SOC calculation unit 48 outputs a signal indicating the calculated SOC to the control device 50.

The FC unit 100 includes a fuel cell. In the fuel cell, hydrogen contained in fuel gas as fuel and oxygen contained in air as an oxidant react with each other to generate power. In the embodiment, the FC power from the FC unit 100 is output to the DC link DL. As a result, the FC power from the FC unit 100 is supplied to the motor 12 via the converter 32 or supplied to the battery system 40. The FC power supplied to the battery system 40 is stored in the battery 42. The configuration of the FC unit 100 will be described later with reference to FIG. 2.

The control device 50 includes a microcomputer including a CPU and a memory connecting to the CPU, and includes an input/output interface such as a timer circuit, an A/D converter, and a D/A converter as necessary. The control device 50 is not limited to include only one control unit, and may include a plurality of control units included in the motor 12, the FC unit 100, the battery system 40, and the like.

In addition to the state of the FC unit 100, the state of the battery 42, and the state of the motor 12, the control device 50 arbitrates and determines the distribution (sharing) of the load to be borne by the FC unit 100, the load to be borne by the battery system 40, and the load to be borne by the motor 12 as a regenerative power source, from the load required of the vehicle system 10 for the entire fuel cell vehicle determined based on inputs (load requests) from various switches and various sensors (not illustrated), or the like and transmits commands to the motor 12, the converter 32, the FC unit 100, and the battery system 40.

As an example, the control device 50 includes a motor control unit 52, a brake control unit 54, and a power control unit 56. As described above, the motor control unit 52, the brake control unit 54, and the power control unit 56 may be replaced with separate control units (for example, the motor ECU, the brake ECU, the battery ECU, and the like).

As an example, the motor control unit 52 calculates a driving force required for the motor 12 based on the output of the vehicle sensor 20, and controls the motor 12 to output the calculated driving force.

As an example, the brake control unit 54 calculates a braking force required for the brake device 16 based on the output of the vehicle sensor 20, and controls the brake device 16 such that it outputs the calculated braking force.

As an example, the power control unit 56 calculates the total required power required for the battery system 40 and the FC unit 100 based on the output of the vehicle sensor 20. The power control unit 56 calculates, for example, a torque to be output by the motor 12 based on the accelerator opening and the vehicle speed, and calculates a total required power by summing a drive shaft required power obtained from the torque and the rotation speed of the motor 12 and a power required by an auxiliary machine or the like to be described later.

In addition, the power control unit 56 calculates a required power for charging and discharging the battery 42 based on the SOC of the battery 42. Then, the power control unit 56 subtracts the required power for charging or discharging of the battery 42 from the total required power (a discharge is set to be positive), calculates the FC required power required for the FC unit 100, and causes the FC unit 100 to generate a power corresponding to the calculated FC required power.

The power control unit 56 switches between a first control mode and a second control mode as a charge and discharge control of the battery system 40. The power control unit 56 normally switches to the first control mode, and switches to the second control mode in a case of a traveling mode (which may also be referred to as an EV evacuation mode) in which the fuel cell vehicle is caused to travel using only battery power.

The first control mode is a mode in which a first voltage L1 higher than a maximum value FH of the generated voltage (referred to as V1) output from a FC stack 110 of the FC unit 100 is set as a minimum value of the voltage of the battery system 40, and the battery voltage is controlled to fall within a range from the first voltage L1 to the maximum value H of a predetermined voltage. Since the battery voltage is not lower than the generated voltage V1 output from the FC stack 110, the FC current is appropriately controlled by an FCVCU 144 described later.

In the second control mode, a second voltage L2 lower than a maximum value FH is set as the minimum value of the voltage of the battery system 40, and the battery voltage is controlled to fall within the range from the second voltage L2 to the maximum value H. By switching to the second control mode in the EV evacuation mode in which the power generation in the FC stack 110 is not performed, the battery power can be used until the battery voltage decreases to the second voltage L2 lower than the first voltage L1. This enables the fuel cell vehicle to travel longer as compared with a case where the minimum value of the voltage of the battery system 40 is continuously set to the first voltage L1.

In the first or second control mode described above, when the battery voltage decreases to the minimum value of each control mode, the power control unit 56 outputs a command to the battery system 40 to limit the current output from the battery system 40 to be small and suppress further decrease in the battery voltage.

In the case of the first control mode, the power control unit 56 further outputs a command to the FC unit 100 to increase the current output from the FC unit 100 by the limited current output from the battery system 40. With such a configuration, it is possible to cause the FC unit 100 to generate and output power corresponding to the suppressed amount of the output power of the battery system 40.

In the case of the second control mode, for example, the power control unit 56 outputs a command to the battery system 40 so as to cut off the output from the battery system 40 from the viewpoint of protecting the cell of the battery 42. With this configuration, overdischarge of the battery system 40 can be prevented.

Figure 2:
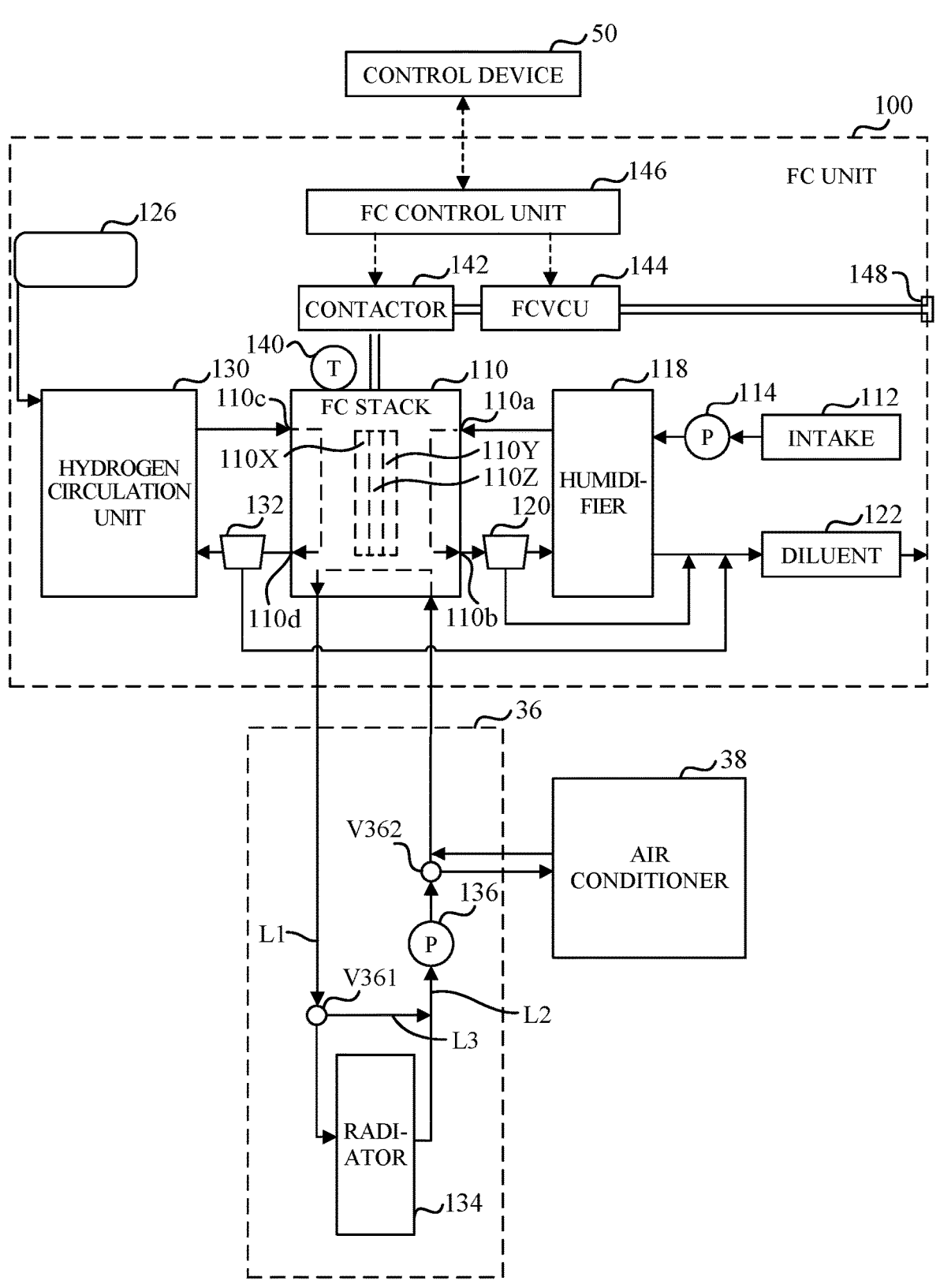
FIG. 2 is a diagram illustrating schematically a configuration of the FC unit of FIG. 1.

FIG. 2 is a schematic configuration diagram illustrating an example of the FC unit 100 and a related device. As an example, the FC unit 100 includes an FC stack 110, an intake 112, an air pump 114, a humidifier 118, a gas-liquid separator 120, a hydrogen tank 126, a hydrogen circulation unit 130, a gas-liquid separator 132, a temperature sensor 140, a contactor 142, a fuel cell voltage control unit (FCVCU) 144, and an FC control unit 146.

The FC unit 100 is connected to the FC cooling device 36, and the FC cooling device 36 is connected to the air conditioner 38.

The FC stack 110 includes a stacked body (not shown) in which a plurality of fuel battery cells are stacked, and a pair of end plates (not shown) sandwiching the stacked body from both sides in the stacking direction.

A fuel battery cell includes a membrane electrode assembly (MEA) and a pair of separators sandwiching the membrane electrode assembly from both sides in a joining direction.

The membrane electrode assembly includes an anode electrode 110X including an anode catalyst and a gas diffusion layer, a cathode electrode 110Y including a cathode catalyst and a gas diffusion layer, and a solid polymer electrolyte membrane 110Z including a cation exchange membrane or the like sandwiched from both sides in a thickness direction by the anode electrode 110X and the cathode electrode 110Y.

A fuel gas containing hydrogen as a fuel is supplied from the hydrogen tank 126 to the anode electrode 110X, and air which is an oxidant gas (reaction gas) containing oxygen as an oxidant is supplied from the air pump 114 to the cathode electrode 110Y.

Hydrogen supplied to the anode electrode 110X is ionized by a catalytic reaction on the anode catalyst, and hydrogen ions move to the cathode electrode 110Y through the appropriately humidified solid polymer electrolyte membrane 110Z. Electrons generated with the movement of hydrogen ions can be extracted to an external circuit (the FCVCU 144 or the like) as a direct current.

Hydrogen ions transferred from the anode electrode 110X onto the cathode catalyst of the cathode electrode 110Y react with oxygen supplied to the cathode electrode 110Y and the electrons on the cathode catalyst to generate water.

The air pump 114 includes a motor driven and controlled by the FC control unit 146, and takes in air from the outside via the intake 112 by the driving force of the motor and compresses the air. The compressed air is sent to the humidifier 118 via an inlet valve (not illustrated). The inlet valve is controlled to open and close by the FC controller 146.

The humidifier 118 humidifies the air compressed by the air pump 114. More specifically, the humidifier 118 includes, for example, a water permeable membrane such as a hollow fiber membrane, and moisture is added to the air by bringing the air from the air pump 114 into contact via the water permeable membrane. The humidified air is supplied from a cathode supply port 110a to the cathode electrode 110Y.

In the gas-liquid separator 120, liquid water and the cathode exhaust gas discharged from a cathode discharge port 110b without being consumed by the cathode electrode 110Y are separated. A part of the cathode exhaust gas separated from the liquid water by the gas-liquid separator 120 is mixed with the air humidified by the humidifier 118 and can be recirculated to the cathode supply port 110a.

Further, the liquid water separated from the cathode exhaust gas by the gas-liquid separator 120 is mixed with the cathode exhaust gas discharged from the cathode discharge port 110b and discharged into the atmosphere through a diluent 122.

The hydrogen tank 126 stores hydrogen in a compressed state. The stored hydrogen is sent to the hydrogen circulation unit 130 via a supply valve (not illustrated). The supply valve is controlled to open and close by the FC control unit 146.

The hydrogen circulation unit 130 supplies hydrogen from the hydrogen tank 126 from an anode supply port 110c to the anode electrode 110X. In addition, the hydrogen circulation unit 130 mixes the anode exhaust gas discharged from an anode discharge port 110d without being consumed by the anode electrode 110X and separated by the gas-liquid separator 132 with hydrogen from the hydrogen tank 126, and recirculates the anode exhaust gas to the anode supply port 110c.

In the gas-liquid separator 132, the anode exhaust gas discharged from the anode discharge port 110d and the liquid water are separated. The liquid water separated from the anode exhaust gas by the gas-liquid separator 132 is mixed with the cathode exhaust gas discharged from the cathode discharge port 110b and discharged to the atmosphere through the diluent 122.

The temperature sensor 140 detects temperatures of the anode electrode 110X and the cathode electrode 110Y of the FC stack 110, and outputs a detection signal to the FC control unit 146.

The contactor 142 is provided between the anode electrode 110X and the cathode electrode 110Y of the FC stack 110 and the FCVCU 144. The contactor 142 electrically connects or disconnects the FC stack 110 and the FCVCU 144 based on a control signal from the FC control unit 146.

The FCVCU 144 is disposed between the contactor 142 and the output terminal 148 to which the electrical load is connected. The FCVCU 144 includes a step-up DC voltage converter, and controls the FC current output from the output terminal 148 while boosting the generated voltage V1 output from the FC stack 110 to a target voltage (defined as V3) in the FCVCU 144. For example, by setting a target voltage V3 higher than the voltage (defined as V2) at the output terminal 148, the FC current is varied according to the voltage difference between the target voltage V3 and the voltage V2.

The target voltage V3 is determined by the FC control unit 146 based on a command from the control device 50 (the power control unit 56). Thus, the generated voltage V1 output from the FC stack 110 is boosted to the target voltage V3, and FC current is output from the output terminal 148 according to the voltage difference between the target voltage V3 and the voltage V2 of the output terminal 148. The output terminal 148 includes a positive electrode and a negative electrode.

In the embodiment, the first voltage L1 (minimum voltage of the battery system 40 in the first control mode) described above is higher than the maximum value FH of the generated voltage V1 that can be output from the FC stack 110. The second voltage L2 (minimum voltage of the battery system 40 in the second control mode) described above is lower than the maximum value of FH described above.

The FC cooling device 36 functions as a first auxiliary machine to be described later. The FC cooling device 36 cools the FC unit 100 by circulating the cooling water through the FC unit 100. The FC cooling device 36 uses, as cooling water, a coolant liquid whose insulation property is improved by removing ions in the cooling water by an ion exchange device or the like (not shown).

An electric water pump 136 sends the cooling water to the FC unit 100 via a second branch control valve V362. The cooling water heated in the FC unit 100 by the heat generation of the FC unit 100 is sent to a radiator 134 via a first branch control valve V361. The radiator 134 cools the cooling water heated in the FC unit 100.

The FC cooling device 36 includes a bypass flow path L3 that bypasses the radiator 134 and connects a flow path L1 on the upstream side of the radiator 134 and a flow path L2 on the downstream side. The first branch control valve V361 is an electromagnetic switching valve for switching between allowing communication or blocking between the flow path L1 and the bypass flow path L3 according to a command from the control device 50. When the flow path L1 and the bypass flow path L3 communicate with each other via the first branch control valve V361, a part (or all) of the cooling water flows toward the electric water pump 136 via the bypass flow path L3. The bypassed cooling water merges with the cooling water cooled by the radiator 134 and is sent to the electric water pump 136.

For example, in a case where the temperature of the FC unit 100 is lower than a predetermined value, the control device 50 switches the first branch control valve V361 so that the flow path L1 and the bypass flow path L3 communicate with each other. As a result, the cooling of the cooling water by the radiator 134 is suppressed as compared with the case where the communication between the flow path L1 and the bypass flow path L3 is interrupted, and the warm-up of the FC unit 100 is promoted.

In the embodiment, the configuration is such that the cooling water cooled by the radiator 134 can be heated by the air conditioner 38. More specifically, the flow path L2 is provided with the second branch control valve V362 that is switched to allow the communication between or blocking between the flow path L2 and the air conditioner 38 in accordance with a command from the control device 50. When the flow path L2 communicates with the air conditioner 38 via the second branch control valve V362, a part (or all) of the cooling water flows to the air conditioner 38. The cooling water having flowed through the air conditioner 38 is heated by the air conditioner 38, returns to the FC cooling device 36 side, joins the cooling water of the FC cooling device 36, and is sent to the electric water pump 136. As a result, the heat generated by the air conditioner 38 can be discarded by the radiator 134 of the FC cooling device 36.

The same coolant liquid is used for the cooling water in the FC cooling device 36 and the hot water circulating in the air conditioner 38.

Further, in a case where the air conditioner 38 is set to heating, the control device 50 switches the second branch control valve V362 such that the flow path L2 communicates with the air conditioner 38 in a state where the temperature of the cooling water of the FC cooling device 36 is equal to or higher than a predetermined value. As a result, the heat generated in the FC unit 100 can be used for raising the temperature of the warm air supplied to the vehicle interior in the air conditioner 38.

Figure 3:
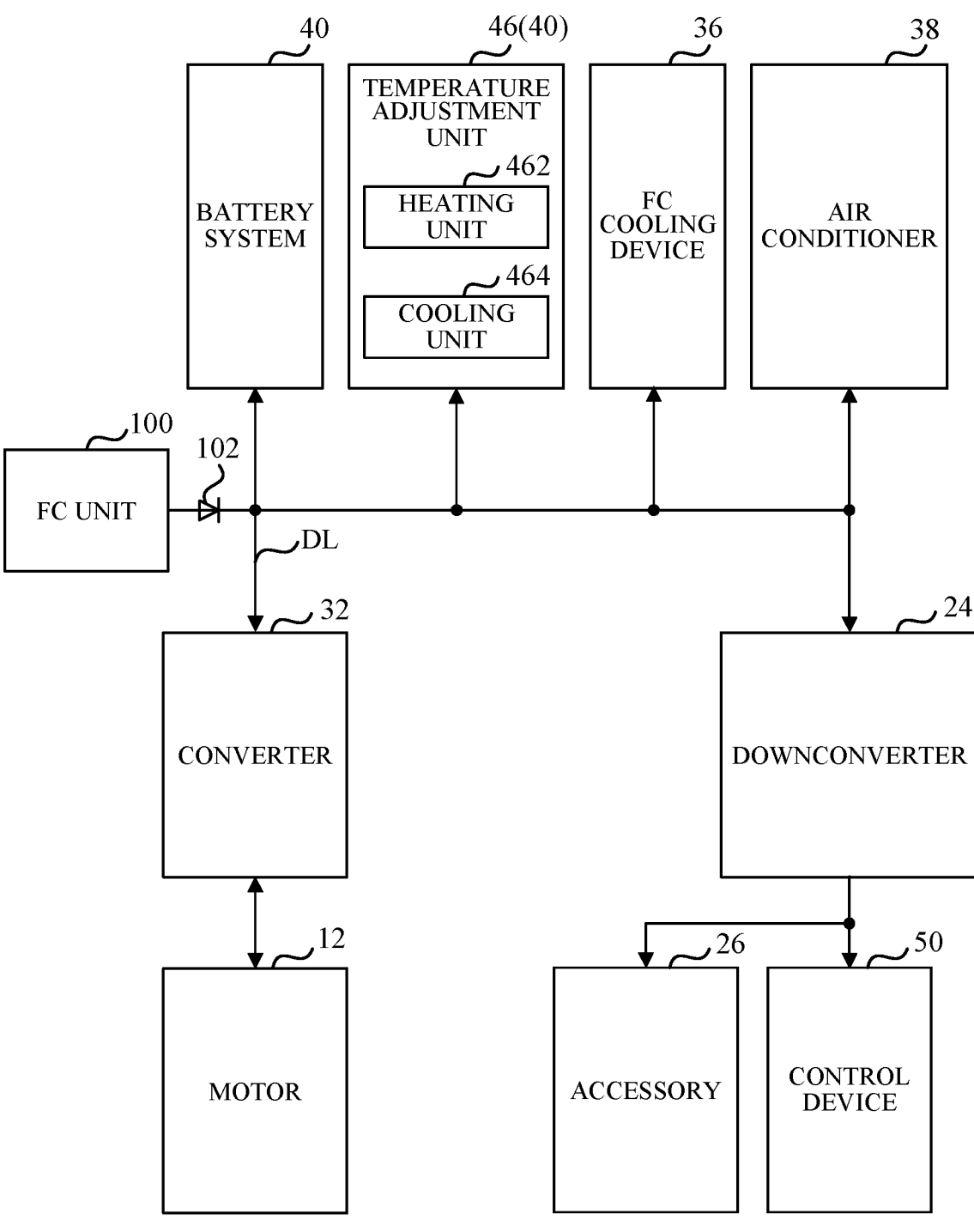
FIG. 3 is a block diagram of a power system of the fuel cell vehicle of FIG. 1.

FIG. 3 is a block diagram of a power system of the fuel cell vehicle. As described above, the vehicle system 10 drives the motor 12 using at least one of the FC power generated in and output from the FC unit 100 and the battery power stored in the battery system 40. In addition, the vehicle system 10 stores the regenerative power generated at the time of regeneration from the motor 12 in the battery system 40. Then, when the SOC of the battery system 40 increases to the predetermined value (in other word, when it is determined that free capacity of the battery system 40 is insufficient), the vehicle system 10 operates an electric device called an auxiliary machine to consume the surplus of power.

The auxiliary machine in the embodiment includes the temperature adjustment unit 46 of the battery system 40, the FC cooling device 36, the air conditioner 38, an accessory 26, and the control device 50.

The FC power and the regenerative power are supplied to the temperature adjustment unit 46 of the battery system 40, the FC cooling device 36, and the air conditioner 38 as auxiliary machines, and are also supplied to the accessory 26 and the control device 50 via a downconverter 24.

The downconverter 24 includes, for example, a step-down DC voltage converter, and converts the FC voltage, the battery voltage, and the regenerative voltage into voltages required by the accessory 26 and the control device 50. The accessory 26 is a general term for electrical components that do not directly affect traveling of the fuel cell vehicle, for example.

As described above, the vehicle system 10 is configured so that the supply destinations of the FC power supplied from the FC unit 100, the battery power supplied from the battery system 40, and the regenerative power supplied from the motor 12 are determined by the control device 50.

Further, the minimum value of the voltage defining the voltage range of the battery system 40 is set to a different value between the first control mode and the second control mode. This enables the FC current to be properly controlled by the FCVCU 144 in the first control mode and allows the fuel cell vehicle to travel longer distance using only the battery power in the second control mode.

Figure 4:
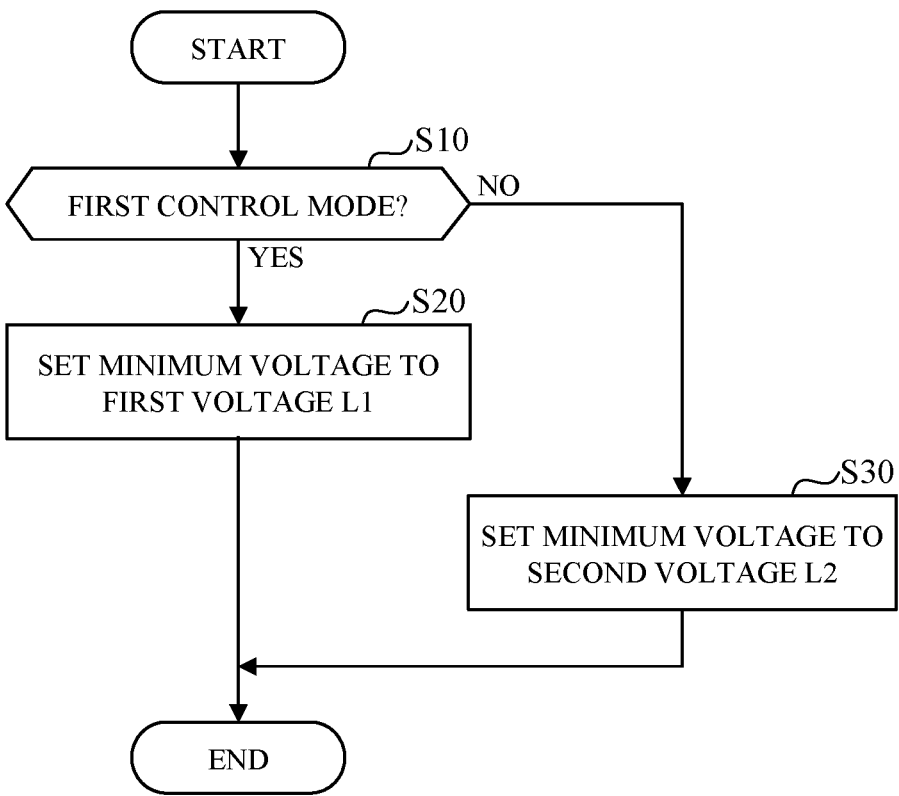
FIG. 4 is a flowchart illustrating a processing of determining a mode for supplying power to a motor.

An example of processing in which the control device 50 switches the first and second control modes will be described with reference to a flowchart of FIG. 4. As an example, when the power switch of the fuel cell vehicle is turned on, the control device 50 repeatedly executes the processing according to FIG. 4.

In step S10 (S: processing step), the control device 50 determines whether the first control mode is appropriate. For example, in a case where the FC unit 100 is performing power generation and the EV evacuation mode is not set by the operation of the driver, the control device 50 makes an affirmative determination in S10 and proceeds to S20. For example, in a case where the FC unit 100 is preparing for power generation or in a case where the EV evacuation mode is set by the operation of the driver, the control device 50 makes a negative determination in S10 and proceeds to S30.

The control device 50 makes an affirmative determination in S10 in a case where the first control mode is appropriate. In S20, the control device 50 sets the first voltage L1 higher than the maximum value FH of the generated voltage V1 output from the FC stack 110 of the FC unit 100 as the minimum value of the voltage of the battery system 40, and ends the processing according to FIG. 4.

Figure 5A:
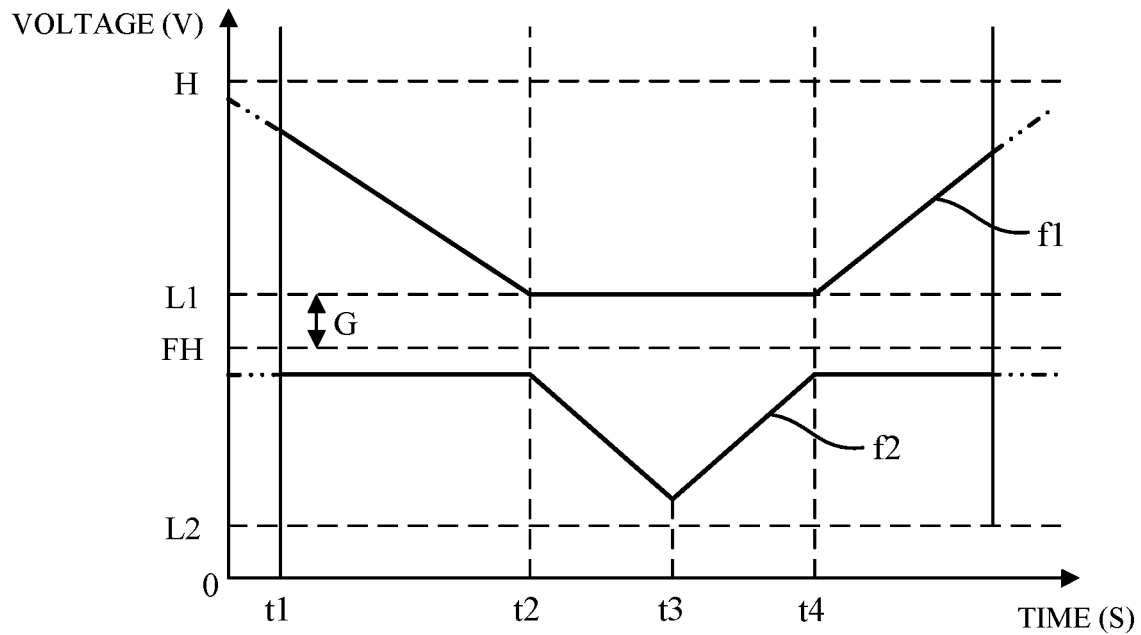
FIG. 5A is a diagram schematically illustrating an example of a change in battery voltage in a first control mode.

FIG. 5A is a diagram schematically illustrating an example of a change in the battery voltage and the FC voltage (generated voltage) in the first control mode. The horizontal axis indicates the elapsed time after the power switch is turned on, and the vertical axis indicates the voltage. A characteristic f1 in FIG. 5A is a change in battery voltage, and a characteristic f2 is a change in generated voltage. Charging and discharging of the battery system 40 are controlled by a command from the control device 50 so that the battery voltage falls within a predetermined voltage range (from the first voltage L1 to the maximum value H). The first voltage L1 is a value obtained by adding a predetermined margin G to the maximum value FH of the generated voltage V1 output from the FC stack 110.

In the example of FIG. 5A, in a case where the output request from the user is constant, the battery voltage of the battery system 40 gradually decreases due to discharge from time t1 to time t2. When the battery voltage decreases to the first voltage L1 at the time t2, the current output from the battery system 40 is limited to decrease by a command from the control device 50, and the decrease in the battery voltage is suppressed. In the first control mode, in addition to the limitation of the battery power output from the battery system 40, the FC current output from the FC unit 100 is increased by the command from the control device 50. The increment of the FC current corresponds to the limit of the output current of the battery system 40. In this way, the total required power is covered by the battery system 40 and the FC unit 100.

When the total required power decreases at time t3, the FC current output from the FC unit 100 decreases, and the generated voltage V1 output from the FC stack 110 increases. At time t4, when the total required power decreases until the battery system 40 can be charged, and the battery voltage starts gradually increasing, the limitation of the output current to the battery system 40 is released according to a command from the control device 50. In addition, the increase in the FC current corresponding to the limitation of the output current of the battery system 40 is terminated.

The control device 50 makes a negative determination in S10 described above in a case where the second control mode is appropriate. In S30, the control device 50 sets the second voltage L2 lower than the maximum value FH of the generated voltage V1 output from the FC stack 110 of the FC unit 100 as the minimum value of the voltage of the battery system 40, and ends the processing according to FIG. 4.

Figure 5B:
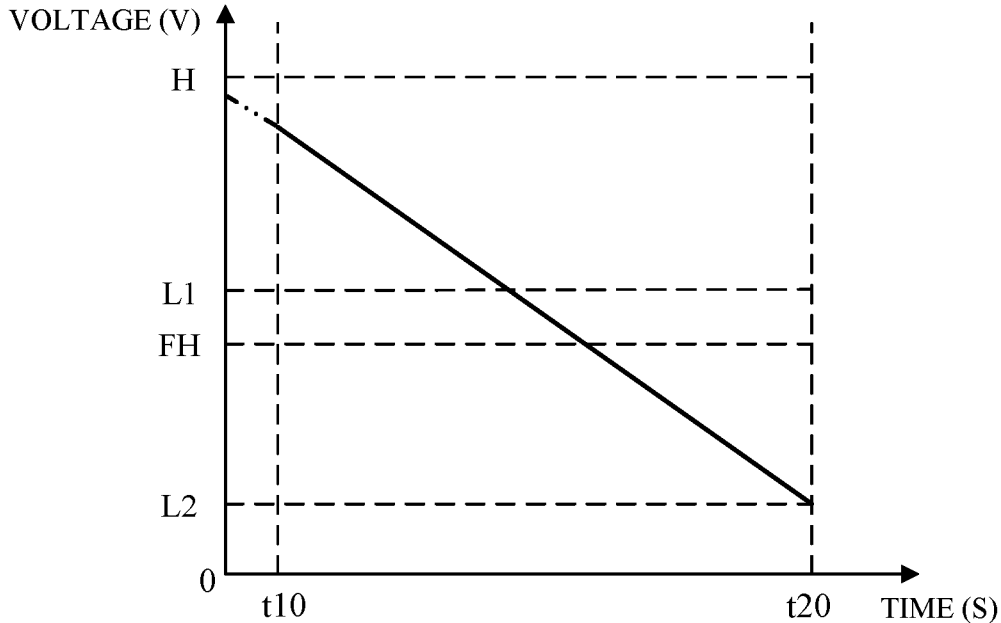
FIG. 5B is a diagram schematically illustrating an example of a change in battery voltage in a second control mode.

FIG. 5B is a diagram schematically illustrating an example of a change in the battery voltage in the second control mode. The horizontal axis in FIG. 5B indicates the elapsed time after the power switch is turned on, and the vertical axis indicates the voltage. Charging and discharging of the battery system 40 are controlled by a command from the control device 50 so that the battery voltage falls within a predetermined voltage range (from the second voltage L2 to the maximum value H).

In the example of FIG. 5B, the battery voltage of the battery system 40 gradually decreases due to discharge from time t10 to time t20. When the battery voltage decreases to the second voltage L2 at time t20, the output from the battery system 40 is cut off in accordance with a command from the control device 50. This prevents overdischarge of the battery system 40.

In the above-described vehicle system 10, in a case where the power switch of the fuel cell vehicle is turned off, the control device 50 may be configured to perform end charge on the battery system 40 to make the SOC of the battery system 40 higher than a predetermined value regardless of the first control mode or the second control mode. This is to increase the battery voltage in preparation for the next activation.

According to the embodiments described above, the following operations and effects are obtained.

(1) The vehicle system 10 mounted on a vehicle driven by the motor 12 includes the FC unit 100 as a fuel cell, the battery system 40 as a chargeable and dischargeable power storage device, and the control device 50 that drives the motor 12 with at least one of FC power as a first power generated in the FC unit 100 and battery power as a second power stored in the battery system 40 to control traveling of the vehicle (FIG. 1). The control device 50 switches a charge and discharge control mode of the battery system 40 between the first control mode in which the first voltage L1 higher than a maximum value FH of the generated voltage V1 generated in the FC unit 100 is set as a minimum value of a voltage of the battery system 40 and charge and discharge control of the battery system 40 is performed and a second control mode in which the second voltage L2 lower than the maximum value FH is set as a minimum value of a voltage of the battery system 40 and charge and discharge control of the battery system 40 is performed (FIG. 4).

With this configuration, it is possible to appropriately control the FC power (for example, the FC current is controlled by the FCVCU 144) in the first control mode. In particular, since the battery voltage is controlled not to be lower than the generated voltage V1 output from the FC stack 110 of the FC unit 100, the FC unit 100 and the battery system 40 are not substantially directly connected via the FCVCU 144. As a result, deterioration of performance of the FC stack 110 due to the current being taken out from the FC unit 100 to the battery system 40 is reliably prevented.

On the other hand, the second control mode allows discharging of the battery system 40 until it drops to a lower battery voltage than in the first control mode. As a result, it is possible to further increase the travel distance of the fuel cell vehicle using only battery power.

(2) The control device 50 switches the control mode to the second control mode in a traveling mode (EV evacuation mode) in which the vehicle is caused to travel using only the battery power.

With this configuration, it is possible to further increase the travel distance of the fuel cell vehicle in the EV evacuation mode.

(3) When the generated voltage V1 generated in the FC stack 110 of the FC unit 100 is lower than the voltage of the battery system 40, the FC unit 100 includes the FCVCU 144 as a DC voltage conversion type output power control unit that controls the output current of the FC unit 100 based on the FC power while boosting the generated voltage V1 (FIG. 2).

With such a configuration, by setting the target voltage V3 higher than the voltage (V2) of the output terminal 148 of the FC unit 100 and boosting the generated voltage V1 to the target voltage V3, the output current of the FC unit 100 can be appropriately controlled according to the voltage difference between the target voltage V3 and the voltage V2.

(4) When the battery voltage of the battery system 40 decreases to the first voltage L1, the control device 50 restricts the output current of the battery system 40 based on the battery power by controlling the battery system 40, and increases the output current of the FC unit 100 based on the FC power by controlling the FCVCU 144.

With this configuration, until the battery voltage of the battery system 40 decreases to the first voltage L1, the battery power is mainly supplied to the load, and the consumption of hydrogen in the FC unit 100 can be suppressed. In addition, after the battery voltage decreases to the first voltage L1, it is possible to maintain the power supply to the load while suppressing the decrease in the battery voltage by increasing the supply of the FC power from the FC unit 100.

(5) The control device 50 performs end charge on the battery system 40 to make the voltage of the battery system 40 higher than a predetermined value (for example, the first voltage L1).

With this configuration, it is possible to increase the battery voltage in preparation for the next activation.

The above embodiment can be varied into various forms. Several modifications will be described below.

In the above embodiment, an example in which end charging is performed on the battery system 40 regardless of whether it is in the first or second control mode is described, but the vehicle system may be configured to perform end charging only when it is in either of the control modes (e.g., the first control mode). In the above embodiment, an example is described in which the battery power is supplied to the load as mains until the battery voltage of the battery system 40 drops to the first voltage L1. Instead, until the battery voltage drops to the first voltage L1, power may be supplied to the load without specifying which of the battery power or the FC power is the main power. However, after the battery voltage drops to the first voltage L1, the supply of FC power from the FC unit 100 is increased to maintain the supply of power to the load while reducing the drop in battery voltage.

The above embodiment can be combined as desired with one or more of the above modifications. The modifications can also be combined with one another.

According to the present invention, it is possible to appropriately control power of a vehicle with a fuel cell and a power storage device using a simple configuration.

Above, while the present invention has been described with reference to the preferred embodiments thereof, it will be understood, by those skilled in the art, that various changes and modifications may be made thereto without departing from the scope of the appended claims.

What is claimed is:

1. A vehicle system mounted on a vehicle driven by an electric motor, comprising:

a fuel cell;

a power storage device configured to be chargeable and dischargeable; and an electronic control unit including a microprocessor and a memory connected to the microprocessor, wherein the microprocessor is configured to perform controlling a traveling of the vehicle by driving of the electric motor with at least one of a first power generated by the fuel cell and a second power stored in the power storage device; and controlling a charge and discharge of the power storage device, and the microprocessor is configured to perform the controlling the charge and discharge of the power storage device including switching a control mode of the charge and discharge of the power storage device between a first control mode where a first voltage higher than a maximum value of a generated power generated in the fuel cell is set as a minimum voltage of the power storage device and a second control mode where a second voltage lower than the maximum value is set as the minimum voltage of the power storage device.

2. The vehicle system according to claim 1, wherein the microprocessor is configured to perform the controlling the charge and discharge of the power storage device including switching the control mode to the second control mode in a predetermined travel mode where the vehicle travels with only the second power.

3. The vehicle system according to claim 2, wherein the microprocessor is configured to perform the controlling the charge and discharge of the power storage device including switching the control mode to the first control mode during a power generation in the fuel cell and when a setting of the predetermined travel mode by an operation of a driver is not made, while switching the control mode to the second control mode during a preparation of the power generation in the fuel cell or when the setting of the predetermined travel mode by the operation of the driver is made.

4. The vehicle system according to claim 1, wherein the fuel cell includes an output power control unit of a DC voltage conversion type that controls an output current of the fuel cell based on the first power while boosting the generated power when the generated power generated in the fuel cell is lower than a voltage of the power storage device.

5. The vehicle system according to claim 4, wherein the microprocessor is configured to perform the controlling the charge and discharge of the power storage device including controlling the power storage device so as to restrict a current output from the power storage device based on the second power and controlling the output power control unit so as to increase a current output from the fuel cell based on the first power, when the voltage of the power storage device decreases to the first voltage.

6. The vehicle system according to claim 1, wherein the microprocessor is configured to perform the controlling the charge and discharge of the power storage device including charging the power storage device so that a voltage of the power storage device is higher than a predetermined value when a power switch of the vehicle is turned off.

7. The vehicle system according to claim 1, wherein the microprocessor is configured to perform the controlling the charge and discharge of the power storage device including cutting off an output from the power storage device when a voltage of the power storage device decreases to the second voltage in the second control mode.

* * * * *